United States Patent Office 3,659,012
Patented Apr. 25, 1972

3,659,012
METHODS OF TREATING HELMINTH INFECTIONS WITH THIOUREA DERIVATIVES
Herschel D. Porter, Lawrence Township, Marion County, and Harold M. Taylor, Washington Township, Marion County, Ind., assignors to Eli Lilly and Company, Indianapolis, Ind.
No Drawing. Filed May 26, 1969, Ser. No. 827,965
Int. Cl. A61k 27/00
U.S. Cl. 424—322                    6 Claims

ABSTRACT OF THE DISCLOSURE 1,1,3-trisubstituted thioureas, active against helminths in warm-blooded animals, and methods for the preparation and use thereof.

BACKGROUND OF THE INVENTION

Heretofore, a number of compounds have been used to combat helminth infections in warm-blooded animals. Among such compounds are the arylthioureas described by Shimotani, J. Pharm. Soc. Japan, 72, 328–330 (1952), and the thiocarbanilides described in Swiss Pat. No. 431,-491 (1967). U.S. Pat. No. 3,395,233 (1968) describes a series of phenylthiourea compounds effective against insects and acarids; however, these phenylthioureas showed no anthelmintic activity when tested against worms in warm-blooded animals. None of the prior art compounds is effective against all species of helminths infesting warm-blooded animals. Therefore, the search for more effective anthelmintics is a continuing one.

SUMMARY

A new series of therapeutic compositions has now been discovered that is effective against a broad spectrum of helminth infections. The new anthelmintic compositions comprise a series of 1,1,3-trisubstituted thioureas having the structure

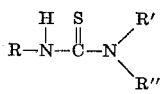

wherein

R is naphthyl, phenyl, or a substituted phenyl group
R' and R", when taken separately, represent $C_3$–$C_6$ alkyl groups branched at the carbon attached to the nitrogen, or a $C_5$–$C_6$–$C_7$ cycloalkyl group and can be the same or different;
R' and R" when taken together with the nitrogen atom to which they are attached form a 5-, 6-, or 7-membered ring having a $C_1$–$C_3$ alkyl substituent attached to each of the carbon atoms in the ring adjacent to the nitrogen, with or without additional $C_1$–$C_3$ alkyl substituents attached to other carbon atoms in the ring, such alkyl substituents being the same or different.

The preparation of the compounds useful in this invention can be carried out by reacting an appropriate aryl or substituted aryl isothiocyanate with an appropriate alkyl or heterocyclic secondary amine in a suitable solvent, followed by isolation of the reaction product and purification thereof by conventional methods.

DESCRIPTION OF THE PREFERRED EMBODIMENTS

This invention is concerned with therapeutic anthelmintic compositions and processes. More particularly, this invention relates to therapeutic compositions containing one or more of the compounds represented by the following structure:

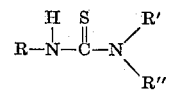

wherein

R is naphthyl, phenyl, or phenyl substituted with at least one substituent selected from the group consisting of $C_1$–$C_4$ alkyl, $C_2$–$C_4$ alkenyl, $C_2$–$C_4$ alkynyl, $C_1$–$C_4$ alkoxy, $C_1$–$C_2$ alkylenedioxy, phenyl, phenoxy, hydroxy, amino, $C_1$–$C_4$ monoalkylamino, $C_1$–$C_4$ dialkylamino, $C_1$–$C_4$ acyl, carboxy, $C_1$–$C_4$ alkoxycarbonyl, carbamyl, $C_1$–$C_4$ alkoxycarbonylamino, $C_1$–$C_4$ acyloxy, $C_1$–$C_4$ alkylsulfonyl, sulfo, sulfamoyl, N-$C_1$–$C_4$ alkylsulfamoyl, N,N-$C_1$–$C_4$ dialkylsulfamoyl, halo, halomethyl, dihalomethyl, trihalomethyl, nitro and cyano;
R' and R", when taken separately, represent $C_3$–$C_6$ alkyl groups branched at the carbon attached to the nitrogen, or a $C_5$–$C_6$–$C_7$ cycloalkyl group, and can be the same or different;
R' and R", when taken together with the nitrogen atom to which they are attached, represent a moiety of the formula

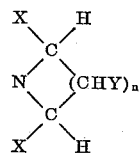

wherein n is a number from 2 to 4;
X is a methyl, ethyl, n-propyl, or isopropyl; and
Y is hydrogen or $C_1$–$C_3$ alkyl.

In the above formula, R represents a naphthyl, phenyl, or phenyl substituted group such as $C_1$–$C_4$ alkylphenyl, $C_1$–$C_4$ dialkylphenyl, $C_2$–$C_4$ alkenylphenyl, $C_2$–$C_4$ dialkenylphenyl, $C_2$–$C_4$ alkynylphenyl, $C_2$–$C_4$ dialkynylphenyl, $C_1$–$C_4$ alkoxyphenyl, $C_1$–$C_4$ dialkoxyphenyl, $C_1$–$C_2$ alkylenedioxyphenyl, biphenyl, phenoxyphenyl, hydroxyphenyl, aminophenyl, diaminophenyl, $C_1$–$C_4$ monoalkylaminophenyl, $C_1-C_4$ dialkylaminophenyl, $C_1-C_4$ acylphenyl (or more precisely, $C_1-C_4$ alkanoylphenyl), carboxyphenyl, $C_1-C_4$ alkoxycarbonylphenyl, carbamylphenyl, $C_1-C_4$ alkoxycarbonylaminophenyl, $C_1-C_4$ acyloxyphenyl (or more precisely, $C_1-C_4$ alkanoyloxyphenyl) $C_1-C_4$ alkylsulfonylphenyl, phenylsulfonic acid, sulfonamidophenyl, N-$C_1-C_4$ alkylsulfonamidophenyl, N,N-$C_1-C_4$ dialkylsulfonamidophenyl, halophenyl, dihalophenyl, trihalophenyl, halomethylphenyl, dihalomethylphenyl, trihalomethyl, $C_1-C_4$ alkylhalophenyl, nitrophenyl, dinitrophenyl, trinitrophenyl, halonitrophenyl, dihalonitrophenyl, halodinitrophenyl, $C_1-C_4$ alkylnitrophenyl, α haloxylyl, α,α′ - dihaloxylyl, α,α,α′ - trihaloxylyl, α,α,α′,α′ - tetrahaloxylyl, α,α,α,α′,α′ - pentahaloxylyl, α,α,α,α′,α′,α′ - hexahaloxylyl, cyanophenyl, and the like.

Halo can be illustratively chloro, bromo, fluoro, and iodo.

R′ and R″, when taken separately, can be illustratively isopropyl, sec-butyl, tert-butyl, 1 - methylbutyl, 1-ethylpropyl, 1,1 - dimethylpropyl, 1,2 - dimethylpropyl, 1-methylpentyl, 1 - ethylbutyl, 1,1 - dimethylbutyl, 1,2-dimethylbutyl, 1 - ethyl - 1 - methylpropyl, 1,1,2 - trimethylpropyl, cyclopentyl, cyclohexyl, cycloheptyl, and the like.

R′ and R″ when taken together with the nitrogen atom to which they are attached form a 5-, 6-, or 7-membered ring having a $C_1-C_3$ alkyl substituent attached to each of the carbon atoms in the ring adjacent to the nitrogen, with or without additional $C_1-C_3$ alkyl substituents attached to other carbon atoms in the ring, such alkyl substituents being the same or different.

Illustrative 1,1,3 - trisubstituted thioureas useful in the anthelmintic processes of this invention include but are not limited to the following compounds:

1,1-diisopropyl-3-(1-naphthyl)-2-thiourea
1,1-di-sec-butyl-3-phenyl-2-thiourea
1,1-di-tert-butyl-3-(4-ethylphenyl)-2-thiourea
1,1-bis(1-methylbutyl)-3-(2-propyl-p-tolyl)-2-thiourea
1,1-bis(1-ethylpropyl)-3-(3-vinylphenyl)-2-thiourea
3-[3-allyl-5-(2-butenyl)phenyl]1,1-di-tert-pentyl-2-thiourea
1,1-bis(1,2-dimethylpropyl)-3-(4-ethynylphenyl)-2-thiourea
3-[3-(3-butynyl)-5-(2-propynyl)phenyl]-1,1-bis(1-methylpentyl)-2-thiourea
3-(4-ethoxyphenyl)-1,1-bis(1-ethylbutyl)-2-thiourea
3-(3-sec-butoxy-5-methoxyphenyl)-1,1-bis(1,1-dimethylbutyl)-2-thiourea
1,1-bis(1,2-dimethylbutyl)-3-(2,3-methylenedioxyphenyl)-2-thiourea
1,1-bis(1-ethyl-1-methylpropyl)-3-(3,4-ethylenedioxyphenyl)-2-thiourea
3-(p-biphenyl)-1,1-bis(1,1,2-trimethylpropyl)-2-thiourea
1,1-dicyclopentyl-3-(3-phenoxyphenyl)-2-thiourea
1,1-dicyclohexyl-3-(2-hydroxyphenyl)-2-thiourea
1,1-dicycloheptyl-3-(3,5-dihydroxyphenyl)-2-thiourea
3-(4-aminophenyl)-1,1-(1,4-dimethyltetramethylene)-2-thiourea
3-(3,5-diaminophenyl)-1,1-(1,4-diethyltetramethylene-2-thiourea
1,1-(1,4-dipropyltetramethylene)-3-[4-(propylamino)phenyl]-2-thiourea
1,1-(1,4-diisopropyltetramethylene)-3-[3-(dimethylamine)phenyl]-2-thiourea
3-[3-(ethylamino)-5-(diisopropylamino)phenyl]-1,1-(1,2,4-trimethyltetramethylene)-2-thiourea
3-(3-acetylphenyl)-1,1-(1,2,4-triethyltetramethylene)-2-thiourea
3-(4-isobutyrylphenyl)-1,1-(1,2,4-tripropyltetramethylene)-2-thiourea
3,(3,5-diacetylphenyl)-1,1-(1,2,4-triisopropyltetramethylene)-2-thiourea
3-(2-carboxyphenyl)-1,1-(1-ethyl-4-methyltetramethylene)-2-thiourea
3-(2,4-dicarboxyphenyl)-1,1-(1-methyl-4-propyltetramethylene)-2-thiourea
3-(4-ethoxycarbonylphenyl)-1,1-(1-isopropyl-4-methyltetramethylene)-2-thiourea
3-(3,5-diethoxycarbonylphenyl)-1,1-(1-ethyl-4-propyltetramethylene)-2-thiourea
3-(2-carbamoylphenyl)-1,1-(1-isopropyl-4-propyltetramethylene)-2-thiourea
3-(2,5-dicarbamoylphenyl)-1,1-(1,2-diethyl-4-methyltetramethylene)-2-thiourea
1,1-(1,4-diethyl-2-methyltetramethylene)-3-[3-(ethylcarbamoyl)phenyl]-2-thiourea
3-[4-(diethylcarbamoyl)phenyl]-1,1-(1-ethyl-2-methyl-4-propyltetramethylene)-2-thiourea
1,1-(1,5-dimethylpentamethylene)-3-(3-propoxycarboxamidophenyl)-2-thiourea
3-(4-acetoxyphenyl)-1,1-(1,5-diethylpentamethylene)-2-thiourea
3-(2,4-diacetoxyphenyl)-1,1-(1,5-dipropylpentamethylene)-2-thiourea
1,1-(1,5-diisopropylpentamethylene)-3-(3-propionyloxyphenyl)-2-thiourea
3-(3-methylsulfonylphenyl)-1,1-(1,3,5-trimethylpentamethylene)-2-thiourea
3-(4-isopropylsulfonylphenyl)-1,1-(1,3,5-triethylpentamethylene)-2-thiourea
3-(3-butylsulfonyl-5-ethylsulfonylphenyl)-1,1-(1,3,5-tripropylpentamethylene)-2-thiourea
3-(2-sulfophenyl)-1,1-(1,3,5-triisopropylpentamethylene)-2-thiourea
1,1-(1-ethyl-5-methylpentamethylene)-3-(4-sulfamoylphenyl)-2-thiourea
3-(3,5-disulfamoylphenyl)-1,1-(1-methyl-5-propylpentamethylene)-2-thiourea
1,1-(1-isopropyl-5-methylpentamethylene)-3-[4-(isopropylsulfamoyl)phenyl]-2-thiourea
1,1-(1,3-diethyl-5-methylpentamethylene)-3-[4-(diethylsulfamoyl)phenyl]-2-thiourea
3-[3-(tert-butylmethylsulfamoyl)phenyl]-1,1-(1,5-diethyl-3-methylpentamethylene)-2-thiourea
3-(2-chlorophenyl)-1,1-(1-ethyl-3-isopropyl-5-methylpentamethylene)-2-thiourea
3-(4-bromophenyl)-1,1-(1,6-dimethylhexamethylene)-2-thiourea
1,1-(1,6-diethylhexamethylene)-3-(3-fluorophenyl)-2-thiourea
1,1-(1,6-diisopropylhexamethylene)-3-(4-iodophenyl)-2-thiourea
3-(3,4-dichlorophenyl)-1,1-(1,6-dipropylhexamethylene)-2-thiourea
3-(2-chloro-6-fluorophenyl)-1,1-(1,3,6-trimethylhexamethylene)-2-thiourea
1,1-(1,3,6-triethylhexamethylene)-3-(2,4,6-trifluorophenyl)-2-thiourea
3-(4-chloro-2,6-difluorophenyl)-1,1-(1,3,6-tripropylhexamethylene)-2-thiourea
3-(2-nitrophenyl)-1,1-(1,3,6-triisopropylhexamethylene)-2-thiourea
3-(3,5-dinitrophenyl)-1,1-(1-ethyl-6-methylhexamethylene)-2-thiourea
3-(2-bromo-5-nitrophenyl)-1,1-(1-methyl-6-propylhexamethylene)-2-thiourea
3-(4-fluoro-2,6-dinitrophenyl)-1,1-(1-isopropyl-6-methylhexamethylene)-2-thiourea
3-(2,5-dichloro-4-nitrophenyl)-1,1-(1,3-diethyl-6-methylhexamethylene)-2-thiourea 3-(α-chloro-o-tolyl)-1,1-(1,6-diethyl-3-methylhexamethylene)-2-thiourea
3-(α,α-diiodo-p-tolyl)-1,1-(1-ethyl-3-isopropyl-6-methylhexamethylene)-2-thiourea
1-cyclopentyl-1-isopropyl-3-(α,α,α-trifluoro-m-tolyl)-2-thiourea
3-(2-chloro-p-tolyl)-1-cyclohexyl-1-(1-methylpentyl)-2-thiourea
1-tert-butyl-1-cycloheptyl-3-(2,6-dichloro-p-tolyl)-2-thiourea
1-sec-butyl-3-(2-chloro-3,5-xylyl)-1-(1-ethyl-1-methylpropyl)-2-thiourea
3-(4-sec-butyl-2-chlorophenyl)-1-(1-ethylbutyl)-1-(1-methylbutyl)-2-thiourea
1-(1,2-dimethylpropyl)-3-(3ethyl-5-fluorophenyl)-1-(1,1,2-trimethylpropyl)-2-thiourea
3-(2,6-difluoro-4-propylphenyl)-1-(1-ethyl-1-methylpropyl)-1-(1-ethylpropyl)-2-thiourea
1-(1,2-dimethylbutyl)-1-(1-ethyl-1-methylpropyl)-3-(4-isopropyl-2-nitrophenyl)-2-thiourea
1-(1,1-dimethylbutyl)-3-($\alpha^2$-fluoro-2,4-xylyl)-1-tert-pentyl-2-thiourea
3-($\alpha^2$-chloro-$\alpha^5$-fluoro-2,5-xylyl)-1-cyclopentyl-1-cycloheptyl-2-thiourea
3-($\alpha^2,\alpha^6$-diiodo-2,6-xylyl)-1,1-diisopropyl-2-thiourea
1,1-di-sec-butyl-3-($\alpha^2,\alpha^2$-difluoro-2,4-xylyl)-2-thiourea
1,1-di-tert-butyl-3-($\alpha^3,\alpha^3,\alpha^4$-trifluoro-3,4-xylyl)-2-thiourea
3-($\alpha^3,\alpha^3$-dichloro-$\alpha^5$-fluoro-3,5-xylyl)-1,1-bis(1-methylbutyl)-2-thiourea
3-($\alpha^2,\alpha^2$-dibromo-$\alpha^5,\alpha^5$-dichloro-2,5-xylyl)-1,1-bis(1-ethylpropyl)-2-thiourea
1,1-bis(1-methylpentyl)-3-($\alpha^2,\alpha^2,\alpha^6,\alpha^6$-tetrafluoro-2,6-xylyl)-2-thiourea
3-($\alpha^2$-chloro-$\alpha^4,\alpha^4,\alpha^4$-trifluoro-2,4-xylyl)1,1-dicyclohexyl-2-thiourea
3-($\alpha^3,\alpha^3$,-difluoro-$\alpha^5,\alpha^5,\alpha^5$-triiodo-3,5-xylyl)-1,1-(1,4-dimethyltetramethylene)-2-thiourea
1,1-(1,5-dimethylpentamethylene)-3-($\alpha^3,\alpha^3,\alpha^3,\alpha^4,\alpha^4$-pentachloro-3,4-xylyl)-2-thiourea
1,1-(1,6-dimethylhexamethylene)-3-($\alpha^2,\alpha^2,\alpha^2,\alpha^6,\alpha^6,\alpha^6$-hexabromo-2,6-xylyl)-2-thiourea
3-($\alpha^2,\alpha^2,\alpha^2$-trichloro-$\alpha^5,\alpha^5,\alpha^5$-trifluoro-2,5-xylyl)-1,1-(1,3,5-trimethylpentamethylene)-2-thiourea
3-(3-cyanophenyl)-1,1-di-tert-pentyl-2-thiourea
3-(4-chloro-3-cyanophenyl)-1,1-bis(1,2-dimethylpropyl)-2-thiourea
3-(2-cyano-p-tolyl)-1,1-bis(1-ethylbutyl)-2-thiourea It is of the essence in the present invention that when R' and R" are independent substituents that each carbon atom attached to the 1-nitrogen must be branched, or part of a $C_5$, $C_6$, or $C_7$ cycloalkyl ring, and that when R' and R" together with the nitrogen atom to which they are attached form a ring, each carbon atom attached to the nitrogen must bear a $C_1$-$C_3$ alkyl substituent.

The compounds useful in this invention are generally crystalline solid materials which are generally soluble in many common organic solvents and relatively insoluble in water. The compounds exhibit the beneficial and desirable characteristics of high helminth toxicity and low mammalian toxicity and are therefore very useful in treating helminthiasis in warm-blooded animals.

The compounds useful in this invention are prepared readily by allowing an isothiocyanate compound of the formula

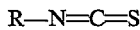

to react with an alkyl or heterocyclic secondary amine of the formula

wherein R, R', R" are defined as above.

The reaction, common in the art, is conveniently carried out in the presence of a suitable liquid reaction medium which is preferably an organic liquid. Alternatively, when the amine reactant is a liquid at the reaction temperature, it can be employed both as the reactant and the liquid reaction medium. The reaction proceeds readily at temperatures between 0° C. and 80° C., and preferably at temperatures between 25° C. and 40° C., with evolution of heat generated from the exothermic nature of the reaction.

Isothiocyanate compounds appropriate for use in making the compounds useful in this invention can be prepared by reacting an aniline having the desired substituents attached thereto with an equimolecular amount of thiophosgene in a suitable reaction medium, such as 0.5 N hydrochloric acid. The resultant isothiocyanate reaction product is partitioned into diethyl ether and recovered therefrom by means known to those skilled in the art.

Suitable organic liquids which can be used as reaction media include hydrocarbons such as benzene, toluene, xylene, and cyclohexane; ethers such as diethyl ether and diisopropyl ether; alcohols such as methanol, ethanol, and isopropanol, chlorinated hydrocarbons such as chloroform and trichloroethylene; tertiary amines such as triethylamine and N-methylpiperidine; as well as solvents such as dimethyl sulfoxide, dimethylformamide, and the like.

The reactants can be employed in any amount, some of the desired product being obtained when the reactants are brought together in any ratio. Equimolecular amounts of the isothiocyanate and the secondary amine are consumed in the reaction, and the use of amounts which represent such proportions are preferred. When the secondary amine compound is employed as the reaction medium simultaneously with its use as a reactant, it is preferable to use an excess of the reactant compound to maintain the liquidity of the reaction mixture.

The reaction is carried out by dissolving the isothiocyanate compound in one of the above-described organic solvents and then introducing the secondary amine compound into the solution of the isothiocyanate compound, with stirring, at such a rate as to control the rate of reaction and to keep the temperature of the reaction mixture below 80° C. While some of the desired product is formed as soon as the reactants are mixed, the yield of the desired product is increased by stirring the reaction mixture for a period of time, preferably from about 30 minutes to about 2 hours. When the reaction is complete, the reaction product mixture is cooled to 0° C. for from 1 to 12 hours, with continued stirring, to effect crystallization, after which the solid material which separates is filtered off. The crude material is purified by recrystallization. Solvents suitable for recrystallization include diethyl ether, ethanol, acetonitrile, dimethyl sulfoxide, benzene, petroleum ether, and the like.

The synthesis of the compounds useful in this invention is further illustrated by the following preparations, which preparations are not to be construed as limiting the scope of this invention.

PREPARATION 1

1,1-(1,5-dimethylpentamethylene)-3-(α,α,α-trifluoro-m-tolyl)-2-thiourea

About 10.2 gm. (0.05 mole) of m-trifluoromethylphenyl-isothiocyanate were added to about 11.3 gm. (0.1 mole) of 2,6-dimethylpiperidine, with stirring. The mixture became hot, and in about 10 minutes crystals began to appear. The reaction product mixture was allowed to stand at room temperature for about 30 minutes, cooled to 0° C. for 12 hours, and filtered. The filter cake was washed with 10 ml. of cold commercial 95% ethanol and then dissolved in 100 ml. of hot commercial 95% ethanol containing 500 mg. of 2,6-dimethylpiperidine. The solution was cooled to 0° C. for 12 hours, and the crystalline precipitate filtered off and dried in vacuo at room temperature. About 9.35 gm. of light yellow crystals melting at about 123–126° C. were obtained and identified by elemental analyses and infrared spectrum as 1,1-(1,5-dimethyl-pentamethylene)-3-($\alpha,\alpha,\alpha$-trifluoro-m-tolyl)-2-thiourea. The yield was 59.0 percent of theory.

Following the general procedure outlined in Preparation 1, and using appropriate starting materials, the following compounds were prepared:

| Product: | Melting point, ° C. |
|---|---|
| 1,1 - (1,5-dimethylpentamethylene)-3-phenyl-2-thiourea | 78–80 |
| 3 - (4 - chlorophenyl)-1,1-(1,5-dimethylpentamethylene)-2-thiourea | 120–124 |
| 1,1 - (1,5 - dimethylpentamethylene)-3-(3-fluorophenyl)-2-thiourea | 98–100 |
| 1,1 - (1,5 - dimethylpentamethylene)-3-(3-nitrophenyl)-2-thiourea | 135–136 |
| 3 - (2,5 - dichlorophenyl)-1,1-(1,5-dimethylpentamethylene)-2-thiourea | 87–89 |
| 3 - (3,4 - dichlorophenyl)-1,1-(1,5-dimethylpentamethylene)-2-thiourea | 138–139 |
| 3 - (2,4 - dichlorophenyl)1,1-(1,5-dimethylpentamethylene)-2-thiourea | 125–128 |
| 3 - (3 - chloro - p - tolyl)-1,1-(1,5-dimethylpentamethylene)-2-thiourea | 122–124 |
| 1,1 - (1,5 - dimethylpentamethylene)-3-($\alpha,\alpha,\alpha$-trifluoro-4-nitro-m-tolyl)-2-thiourea | 122–123 |
| 1,1 - (1,5 - dimethylpentamethylene)-3-(3,4-xylyl)-2-thiourea | 111–113 |
| 1,1 - (1,5 - dimethylpentamethylene)-3-($\alpha,\alpha,\alpha$-trifluoro-m-tolyl)-2-thiourea | 124–128 |
| 3 - (3 - chloro - p - tolyl)-1,1-(1,5-dimethyltetramethylene)-2-thiourea | 127–130 |
| 1,1 - (1,4 - dimethyltetramethylene)-3-(3,4-xylyl)-2-thiourea | 126–128 |
| 3 - (6 - chloro - $\alpha,\alpha,\alpha$-trifluoro-m-tolyl)-1,1-(1,5-dimethylpentamethylene)-2-thiourea | 118–122 |
| 3 - ($\alpha,\alpha,\alpha$ - trifluoro-m-tolyl)-1,1-(1,3,5-trimethylpentamethylene)-2-thiourea | 80–83 |

PREPARATION 2

1,1-di(sec-butyl)-3-(3-chloro-p-tolyl)-2-thiourea

To a solution of 9.0 gm. (0.05 mole) of 3-chloro-4-methylphenylisothiocyanate in 100 ml. of diethyl ether were added, with stirring, 6.5 gm. (0.05 mole) of di-sec-butylamine. A mild exothermic reaction occurred. The reaction mixture was stirred for 30 minutes, and then 100 ml. of petroleum ether were added. The reaction mixture was cooled to room temperature, filtered, and the filtrate concentrated in vacuo. The yellow oil thus obtained was dissolved in 100 ml. of hot petroleum ether and the solution cooled to 0° C. for 24 hours. The white precipitate was filtered off and recrystallized from petroleum ether to yield off-white crystals melting at about 57–59° C. and identified as 1,1 - di(sec - butyl)-3-(3-chloro-p-tolyl)-2-thiourea. The yield was 38.0 percent of theory.

Following the same procedure as in Preparation 2, and using suitably substituted isothiocyanates and secondary amines, the following compounds were prepared:

| Product: | Melting point, ° C. |
|---|---|
| 1,1-diisopropyl-3-phenyl-2-thiourea | 67–70 |
| 3 - (3 - chlorophenyl) - 1,1 - diisopropyl - 2-thiourea | 64–65 |
| 3 - (2 - fluorophenyl) - 1,1 - diisopropyl - 2-thiourea | 68–71 |
| 3 - (3 - fluorophenyl) - 1,1 - diisopropyl - 2-thiourea | 64–68 |
| 3 - (4 - fluorophenyl) - 1,1 - diisopropyl - 2-thiourea | 108–110 |
| 3 - (3 - cyanophenyl) - 1,1 - diisopropyl - 2-thiourea | 112–115 |
| 1,1 - diisopropyl - 3 - (3 - nitrophenyl) - 2-thiourea | 126–131 |
| 1,1 - diisopropyl-3-(3-methylsulfonylphenyl)-2-thiourea | 134–137 |
| 1,1 - diisopropyl - 3-($\alpha,\alpha,\alpha$-trifluoro-o-tolyl)-2-thiourea | 98–100 |
| 1,1 - diisopropyl - 3 - ($\alpha,\alpha,\alpha$-trifluoro-m-tolyl)-2-thiourea | 84–86 |
| 1,1 - diisopropyl - 3 - (4 - nitrophenyl) - 2-thiourea | 125–129 |
| 3 - (3,4 - dichlorophenyl) - 1,1-diisopropyl-2-thiourea | 115–118 |
| 3 - (3 - chloro - p - tolyl) - 1,1 - diisopropyl-2-thiourea | 104–106 |
| 3 - (6 - chloro - $\alpha,\alpha,\alpha$-trifluoro-m-tolyl)-1,1-diisopropyl-2-thiourea | 78–81 |
| 1,1 - diisopropyl - 3-($\alpha,\alpha,\alpha$-trifluoro-4-nitro-m-tolyl)-2-thiourea | 125–130 |
| 1,1-diisopropyl-3-(3,4-xylyl)-2-thiourea | 118–120 |
| 1,1-diisopropyl-3-(1-naphthyl)-2-thiourea | 119–120 |
| 1,1-diisopropyl-3-(2-naphthyl)-2-thiourea | 85–87 |
| 1,1-di(sec-butyl)-3-phenyl-2-thiourea | 51–54 |
| 1,1 - dicyclohexyl - 3 - ($\alpha,\alpha,\alpha$ - trifluoro-m-tolyl)-2-thiourea | 108–111 |
| 1,1 - dicyclohexyl - 3 - (4 - nitrophenyl)-2-thiourea | 150–153 |
| 3 - (3 - chloro - p-tolyl)-1,1-dicyclohexyl-2-thiourea | 90–93 |
| 1,1-dicyclohexyl-3-(3,4-xylyl)-2-thiourea | 97–98 |

It has been found that the 1,1,3-trisubstituted thioureas described above possess outstanding anthelmintic activity when administered orally in effective amounts to a parasitized host. The active compound can be administered alone or in combination with other materials, such as medicinal preparations, nutrients, inert substances, and the like. The thiourea compound can be incorporated in a variety of pharmaceutical dosage forms; for example, as a compressed tablet, filled capsule, granule, powder, liquid suspension, or the like. The solid dosage forms are particularly convenient to administer, and in a preferred embodiment of this invention, comprise compressed tablets or filled capsules in which the active compound is combined with compatible excipients such as starch, lactose, microcrystalline cellulose, sodium lauryl sulfate, talc, magnesium stearate, sodium carboxymethylcellulose, sodium alginate, and the like, in such amounts and proportions as to provide a unit dose which can contain from about 5.0 mg. to 5000.0 mg. of the anthelmintic compound.

In another embodiment of this invention, the active compound can be included in a liquid suspension in which the vehicle can be comprised of water, an edible oil, or an edible polyol such as, for example, glycerine or 1,2-propanediol, to which suspension can be added any of a variety of additional excipients such as preservatives, suspending agents, surfactants, flavoring agents, specific gravity-adjusting agents, and the like.

In still another embodiment of the present invention, the active 1,1,3-trisubstituted thiourea compound can be administered orally in a suitable feed. Administering the anthelmintic compound in the feed of farm animals is preferably accomplished by preparing an appropriate feed premix containing the thiourea and incorporating the premix into the complete ration. The premix can be prepared by mixing the active compound with, for example, alfalfa grits, solvent-extracted soybean feed, corn meal, and the like, or a non-nutritive, nonirritating material which is acceptable to the animal such as exfoliated hydrobiotite, kaolin, talc, attapulgite, bentonite, microcrystalline cellulose, and the like, in high concentration. The premix is then added to or mixed with the feed to provide a ration containing from about 0.025 percent to about 2.5 percent of the anthelmintic compound. Alternatively, an intermediate concentrate or feed supplement containing the thiourea compound can be blended into the feed.

The preferred method for adding the anthelmintic compound to the feed of domestic animals comprises the incorporation of from 5 to 50 percent by weight of the thiourea compound into a granule or powder in intimate admixture with physiologically inert excipients, such as, illustratively, kaolin, bentonite, talc, sodium carboxymethylcellulose, starch, and the like, so that the proper unit dosage quantity in grams may be related to the conventional units of volume, such as tablespoon, cup, pint, and the like, readily understood by the average animal owner. Granules having a diameter of from 0.5 mm. to 2.0 mm. are preferred because of consistent density, flow characteristics, and ease of uniform blending throughout the feed in the desired amount.

The active thiourea compound can be given in a single dose or in divided doses. When given as a single dose, the dosage of the active compound can range from about 5 to about 500 mg./kg. of body weight, preferably from about 25 to about 100 mg./kg. A divided dosage regimen can comprise a total dose of from about 25 to about 2500 mg./kg., or more, the exact total dose being a function of the amount in each treatment dose and the duration thereof. A method of choice for treating helminthiasis in dogs and cats comprises the administration of a single dose of, for example, 100 mg./kg. of 1,1-(1,5-dimethylpentamethylene)-3-($\alpha,\alpha,\alpha$-trifluoro-m-tolyl)-2-thiourea in the form of compressed tablets. A preferred method for treating farm animals, such as poultry or swine, comprises adding an appropriate amount of a feed premix containing the active compound to the animals' daily ration so as to provide for the ingestion by each animal of about 100 mg./kg. of, for example 1,1-diisopropyl-3-($\alpha,\alpha,\alpha$-trifluoro-m-tolyl)-2-thiourea. Those skilled in the art will recognize that the actual dosage and mode of administration will be governed by the species, age, size, and general condition of the animal, the severity of the helminth infection, and the convenience of the method of treatment.

The anthelmintic activity of the compounds useful in this invention has been demonstrated in in-vivo tests against the dog large roundworms (ascarids), *Toxocara canis* and *Toxascaris leonina;* dog hookworms, *Ancylostoma caninum* and *Uncinaria stenocephala;* and the dog tapeworms, Taenia spp. and *Dipylidium caninum*. The thiourea compounds have also been shown by in-vivo tests in the rat to control the small roundworm species, *Strongyloides ratti.* In addition, the thiourea compounds useful in this invention have been shown to possess in-vivo activity against the helminth species Physaloptera spp. in dogs; *Toxocara cati* and *Ancyclostoma caninum* in cats; *Ascaridia galli* and *Heterakis gallinarum* in chickens; Trichostrongylus spp., Nematodirus spp., Moniezia spp., and *Haemonchus contortus* in sheep; and *Ascaris suum* in swine. In further tests, the larval stage, microfilaria, of the dog heartworm, *Dirofilaria immitis,* circulating in the blood has been effectively controlled by the administration of 25 mg./kg./day of 1,1-(1,5-dimethylpentamethylene)-3-($\alpha,\alpha,\alpha$-trifluoro-m-tolyl)-2-thiourea for 29 days. While the mature worms are not killed, the larval stage of the infection is brought under control, thus eliminating a vector in the transmission of the dog heartworm in the canine population.

Those skilled in the art generally recognize that agents which are effective against species of helminths such as those listed immediately above will also generally show activity against similar helminth species which parasitize humans, such as the large roundworm (ascardis), *Ascaris lumbricoides;* the hookwarm, *necator americanus;* the tapeworm, *Taenia solium, Taenia saginata,* and Diphyllobothrium spp.; and the small roundworm, *Stronglyoides stercoralis.*

The following examples further illustrate the present invention.

EXAMPLE 1

Evaluation of the anthelmintic properties of the 1,1,3-trisubstituted thioureas was carried out in vitro on the third-stage exsheathed sheep nematode, *Haemonchus contortus*. The third-stage larvae were suspended in buffered physiological saline of pH 7.2 in a dilution that provided about 100 larvae per 0.1 ml. About 5.0 mg. of the test compound were weighed into a 15-ml. test tube, to which was added one drop of a 1:1 mixture of polyoxyethylene sorbitan monolaurate and water. About 0.45 ml. of acetone was added to the test tube to accomplish solution of the test compound, and about 4.5 ml. of buffered physiological saline of pH 6.4 were added to complete the dilution to about 1000 p.p.m. The testing at 1000 p.p.m. was carried out by placing 0.9 ml. of the test compound solution and 0.1 ml. of the *Haemonchus contortus* larvae suspension in a plastic well of a hemagglutination plate and the medium incubated for 18 hours at 37–38° C. When the test was conducted at 100 p.p.m. of the test compound, 0.1 ml. of the test compound solution, 0.8 ml. of buffered physiological saline, and 0.1 ml. of the *Haemonchus contortus* larvae suspension were added to the plastic well and incubated as before. At the end of the incubation period, the test in the plastic well was observed for worm motality.

The following listed compounds all decreased worm motility by at least 70 percent at dilutions of 100 p.p.m. At the higher concentration, many of the compounds completely suppressed worm motility.

COMPOUNDS 3-(2,4-dichlorophenyl)-1,1-(1,5-dimethylpentamethylene)-2-thiourea
3-(4-chlorophenyl)-1,1-(1,5-dimethylpentamethylene)-2-thiourea
1,1-(1,5-dimethylpentamethylene)-3-(3-fluorophenyl)-2-thiourea
3-(2,5-dichlorophenyl)-1,1-(1,5-dimethylpentamethylene)-2-thiourea
3-(3,4-dichlorophenyl)-1,1-(1,5-dimethylpentamethylene)-2-thiourea
1,1-(1,5-dimethylpentamethylene)-3-(3,4-xylyl)-2-thiourea
3-(6-chloro-$\alpha,\alpha,\alpha$-trifluoro-m-tolyl)-1,1-(1,5-dimethylpentamethylene)-2-thiourea
1,1,-(1,5-dimethylpentamethylene)-3-($\alpha,\alpha,\alpha$-trifluoro-4-nitro-m-tolyl)-2-thiourea
1,1-(1,5-dimethylpentamethylene)-3-phenyl-2-thiourea
1,1-(1,5-dimethylpentamethylene)-3-($\alpha,\alpha,\alpha$-trifluoro-m-tolyl)-2-thiourea
1,1-(1,5-dimethylpentamethylene)-3- $\alpha,\alpha,\alpha$-trifluoro-p-tolyl)-2-thiourea
3-($\alpha,\alpha,\alpha$-trifluoro-m-tolyl)-1,1-(1,3,5-trimethylpentamethylene)-2-thiourea
1,1-(1,4-dimethyltetramethylene)-3-($\alpha,\alpha,\alpha$-trifluoro-m-tolyl)-2-thiourea
1,1-diisopropyl-3-phenyl-2-thiourea
1,1-diisopropyl-3-(1-naphthyl)-2-thiourea
1,1-diisoproply-3-(2-naphthyl)-2-thiourea
3-(4-acetylphenyl)-1,1-diisopropyl-2-thiourea
3-($\alpha,\alpha,\alpha,\alpha',\alpha',\alpha'$-hexafluoro-3,5-xylyl)-1,1-diisopropyl-2-thiourea
1,1-diisopropyl-3-(2-nitrophenyl)-2-thiourea
3-(4-cyanophenyl)-1,1-diisopropyl-2-thiourea
1,1-diisopropyl-3-(4-methoxyphenyl)-2-thiourea
1,1-diisopropyl-3,(3-methoxyphenyl)-2-thiourea
1,1-diisopropyl-3-(p-tolyl)-2-thiourea
1,1-diisopropyl-3-($\alpha,\alpha,\alpha$-trifluoro-m-tolyl)-2-thiourea
1,1-diisopropyl-3-(m-tolyl)-2-thiourea
1,1-diiospropyl-3-(3-methylsulfonylphenyl)-2-thiourea
1,1-diisopropyl-3-($\alpha,\alpha,\alpha$-trifluoro-o-tolyl)-2-thiourea
3-(6-chloro-$\alpha,\alpha,\alpha$-trifluoro-m-tolyl)-1,1,-diisopropyl-2-thiourea 1,1-diisopropyl-3-(3,4-xylyl)-2-thiourea
3-(3,4-dichlorophenyl)-1,1-diisopropyl-2-thiourea
3-(2-fluorophenyl)-1,1,-diisopropyl-2-thiourea
3-(2,4,5-trichlorophenyl)-1,1-diisopropyl-2-thiourea
3-(3,5-dibromophenyl)-1,1-diisopropyl-2-thiourea
1,1-diisopropyl-3-(3-nitrophenyl)-2-thiourea
1,1-diisopropyl-3-(4-nitrophenyl)-2-thiourea
3-(3-cyanophenyl)-1,1-diisopropyl-2-thiourea
3-(3-chloro-p-tolyl)-1,1-diisopropyl-2-thiourea
3-(4-fluorophenyl)-1,1-diisopropyl-2-thiourea
3-(3-fluorophenyl)-1,1-diisopropyl-2-thiourea
1,1-dicyclohexyl-3-(4-nitrophenyl)-2-thiourea
3-(3-chloro-p-tolyl)-1,1-dicyclohexyl-2-thiourea
1,1-dicyclohexyl-3-(3,4-xylyl)-2-thiourea
1,1-dicyclohexyl-3-($\alpha,\alpha,\alpha$-trifluoro-m-tolyl)-2-thiourea
1,1-di(sec-butyl)-3-(4-nitrophenyl)-2-thiourea
1,1-di(sec-butyl)-3-(3-chloro-p-tolyl)-2-thiourea

EXAMPLE 2

Mongrel dogs, unwormed for at least 30 days prior to the administration of the test compound, were used in this critical test. The use of the word "critical" in connection with an anthelmintic test signifies that all of the worms passed in the feces were recovered, identified and counted during the observation period and that the animal was sacrificed and necropsied and the number and species of worms remaining in the host determined. Each dog served as its own standard. Each dog was placed in an individual cage, allowed several days to adjust to his environment, and the presence of a natural helminth infection confirmed by examining the feces for parasitic ova or tapeworm segments. Each dog was fed a daily ration sufficient for the size of the dog used, water being provided ad libitum. A single oral dose of 100 mg./kg. of body weight of thiourea test compound was administered to each dog, with the exception of the first two compounds listed in Table I, and marked with an asterisk. Each of these two compounds was administered at a dosage of 350 mg./kg. of body weight. The dosage was prepared by grinding the test compound to a fine powder in a mortar and pestle. The finely ground powder was filled into large gelatin capsules which were administered orally with or without a balling gun. Fecal material was collected daily for three days after treatment and screened for passed worms which were counted and identified according to species and maturity. If nematode species only were found in the feces, the dogs were sacrificed three days after treatment and any worms remaining in the gut recovered. If tapeworms were identified in the feces, the dogs were sacrificed 10 to 14 days after treatment. All of the worms remaining in the gut of the animal at necropsy were then counted and identified as to species and maturity. The number of worms found at necropsy was added to the number of worms passed to give the total count. The percent of worms removed by the thiourea was computed by dividing the number of each helminth species passed by the total count. The common dog hookworm, *Ancylostoma caninum*, was present in all the dogs sacrificed; and in addition, one or more of the following species were found in the dogs: *Toxocara canis, Toxascaris leonina, Uncinaria stenocephala, Trichuris vulpis*, Taenia spp., *Dipylidium caninum*, and Physaloptera spp. Table I summarizes the results of the treatments with representative 1,1,3 trisubstituted thioureas against the three most frequently observed helminths, *Toxocara canis, Ancyclostoma caninum*, and *Uncinaria stenocephala*.

TABLE I

Anthelmintic efficacy of representative 1,1,3 trisubstituted thioureas in dogs [1]

| Compound | No. dogs tested | Percent worms removed,[2] helminth | | |
|---|---|---|---|---|
| | | Toxocara canis | Ancylostoma caninum | Uncinaria stenocephala |
| 1,1-diisopropyl-3-phenyl-2-thiourea* | 4 | {100 M [3] / 100 I[3]} | 86 | 100 |
| 3-(3,4-dichlorophenyl)-1,1-diisopropyl-2-thiourea* | 4 | 100 M | 90 | 100 |
| 3-(3-fluorophenyl)-1,1-diisopropyl-2-thiourea | 5 | {— M / 50 I} | 33 | 100 |
| 1,1-diisopropyl-3-($\alpha,\alpha,\alpha$-trifluoro-m-tolyl)-2-thiourea | 4 | {100 M / 100 I} | 100 | 100 |
| 3-($\alpha,\alpha,\alpha,\alpha',\alpha',\alpha'$-hexafluoro-3,5-xylyl)-1,1-diisopropyl-2-thiourea | 3 | {100 M / 100 I} | 5 | 0 |
| 3-(3-chloro-p-tolyl)-1,1-diisopropyl-2-thiourea | 2 | {100 M / — I} | 100 | 100 |
| 3-(3-cyanophenyl)-1,1-diisopropyl-2-thiourea | 2 | {100 M / 100 I} | 95 | — |
| 1,1-diisopropyl-3-(3-methoxyphenyl)-2-thiourea | 2 | {— M / — I} | 52 | 10 |
| 3-(6-chloro-$\alpha,\alpha,\alpha$-trifluoro-m-tolyl)-1,1-diisopropyl-2-thiourea | 2 | {— M / — I} | 50 | 100 |
| 3-(2-fluorophenyl)-1,1-diisopropyl-2-thiourea | 2 | {100 M / 100 I} | 76 | — |
| 1,1-diisopropyl-3-($\alpha,\alpha,\alpha$-trifluoro-o-tolyl)-2-thiourea | 2 | {100 M / 100 I} | 81 | 69 |
| 3-(3,5-dibromophenyl)-1,1-diisopropyl-2-thiourea | 1 | {— M / 100 I} | 100 | — |
| 1,1-(1,5-dimethylpentamethylene)-3-($\alpha,\alpha,\alpha$-trifluoro-m-tolyl)-2-thiourea | 6 | {100 M / 100 I} | 99+ | 100 |
| 1,1-(1,5-dimethylpentamethylene)-3-phenyl-2-thiourea | 2 | {100 M / 100 I} | 67 | 89 |
| 3-(2,5-dichlorophenyl)-1,1-(1,5-dimethylpentamethylene)-2-thiourea | 2 | {— M / 100 I} | 100 | 85 |
| 3-(6-chloro-$\alpha,\alpha,\alpha$-trifluoro-m-tolyl)-1,1-(1,5-dimethylpentamethylene)-2-thiourea | 1 | {100 M / 100 I} | 100 | — |
| 3-(4-chlorophenyl)-1,1-(1,5-dimethylpentamethylene)-2-thiourea | 1 | {— M / — I} | 100 | 100 |
| 3-(3,4-dichlorophenyl)-1,1-(1,5-dimethylpentamethylene)-2-thiourea | 4 | {100 M / 100 I} | 78 | 100 |
| 3-($\alpha,\alpha,\alpha$-trifluoro-m-tolyl)-1,1-(1,3,5-trimethylpentamethylene)-2-thiourea | 1 | {— M / 100 I} | 100 | 100 |
| 1,1-diisopropyl-3-($\alpha,\alpha,\alpha$-trifluoro-m-tolyl)-2-thiourea | 8 | {39 M / 34 I} | 94 | — |
| 1,1-di(sec-butyl)-3-(3-chloro-p-tolyl)-2-thiourea | 1 | {— M / 100 I} | 25 | — |

*Dosage: 350 mg./kg.
[1] Single oral dose of 100 mg./kg. of body weight.
[2] Percent Worms Removed = $\frac{\text{Worms Passed}}{\text{Total Worms}} \times 100$.
[3] M=Mature; I=Immature.
—=No worms of the species were observed.

EXAMPLE 3

The anthelmintic activity of 1,1-(1,5-dimethylpentamethylene) - 3 - ($\alpha,\alpha,\alpha$ - trifluoro - m - tolyl)-2-thiourea was determined by following in detail the procedures outlined in Example 2. Both compressed tablets and filled capsules were employed. Results are summarized in Table II.

TABLE II

Anthelmintic efficacy of 1,1-(1,5-dimethylpentamethylene)-3-($\alpha,\alpha,\alpha$-trifluoro-m-tolyl)-2-thiourea in dogs [1]

| Dosage form | No. dogs tested | Percent worms removed,[2] helminth | | |
|---|---|---|---|---|
| | | *Toxocara canis* | *Ancylostoma caninum* | *Uncinaria stenocephala* |
| Filled capsules | [3] 9 | {97 M [4]<br>{82 I [4] | 97 | 91 |
| Compressed tablets | 19 | {67 M<br>{21 I | 96 | 100 |

[1] Single oral dose of 100 mg./kg. of body weight.
[2] Percent Worms Removed = $\frac{\text{Worms Passed}}{\text{Total Worms}} \times 100$.
[3] Number includes the 6 dogs reported in Table I.
[4] M=Mature; I=Immature.

EXAMPLE 4

The compound 1,1 - (1,5 - dimethylpentamethylene)-3-($\alpha,\alpha,\alpha$-trifluoro-m-tolyl)-2-thiourea was administered orally to two dogs over a period of several days as shown in Table III. Both dogs were found to be infected with the heartworm, *Dirofilaria immitis*, by a quantitative examination of the blood for microfilaria, the larvae stage of the heartworm. Each dog was treated once each day with an oral capsule. The absorption of therapeutically effective amounts of the test compound into the blood stream of the animals is shown by the reduction in the number of microfilaria in the blood over the duration of the treatment. The mature heartworms are to be found in the heart chambers of the animal, while the larvae of the worm inhabits the blood. It is suggested by the data that daily administration of the test compound for several days is advantageous in achieving efficacy against the microfilaria.

TABLE III

Efficacy of 1,1-(1,5-dimethylpentamethylene)-3-($\alpha,\alpha,\alpha$-trifluoro-m-tolyl)-2-2-thioreau against the microfilaria of the dog heartworm larvae

| Level mg./kg. body weight | Method of treatment | No. days treated | Effect on microfilaria [1] | Effect on *Dirofilaria immitis* [2] |
|---|---|---|---|---|
| 100 | Oral capsule. | 11 | 87% reduction | None. |
| 25 | do | 29 | 100% reduction | Killed microfilaria within live females. |

[1] Larval stage of heartworm.
[2] Mature heartworm.

EXAMPLE 5

A medicated feed suitable for chickens is prepared by incorporating the test compound, 1,1-diisopropyl-3-($\alpha,\alpha,\alpha$-trifluoro-m-tolyl)-2-thiourea, in a feed premix and blending the thus prepared premix with a ton of ration to provide a chicken feed containing 2000 gm. of the active compound per ton.

The premix is prepared by grinding the active compound to a fine powder and mixing 100 gm. of the thus prepared compound with 344 gm. of solvent-extracted soybean meal, adding thereto 10 gm. of mineral oil to stick the ingredients together and reduce the dustiness of the premix.

The premix prepared as illustrated above is intimately blended with the components of a chicken ration to produce a feed containing 2000 gm. active compound per ton according to the following formula:

| Ingredient: | Quantity, lbs. |
|---|---|
| Corn, yellow, ground | 1142 |
| Soybean oil meal, solvent extracted (50%) | 360 |
| Corn gluten meal (60%) | 100 |
| Distillers dried solubles, corn | 100 |
| Fish meal with solubles | 100 |
| Meat scraps (55%) | 80 |
| Alfalfa meal, dehydrated (17%) | 38 |
| Animal fat, beef tallow | 20 |
| Dicalcium phosphate, feed grade | 12 |
| Calcium carbonate (ground limestone) | 10 |
| Salt (NaCl) | 6 |
| Anthelmintic premix | 20 |
| Trace mineral premix [1] | 2 |
| Vitamin premix [2] | 10 |
| Total | 2000 |

[1] Each pound contains: manganese, 30.4 mg.; zinc, 34.0 mg.; Iron 7.7 mg.; copper, 0.8 mg.; and iodine, 0.4 mg.
[2] Each pound contains: 450,000 I.U. Vitamin A; 120,000 I.C.U. Vitamin $D_3$; 1000 I.U. Vitamin E; Menadione Sodium Bisulfate, 100 mg.; Riboflavin, 400 mg.; Niacin, 3600 mg.; d-Pantothenic Acid, 966 mg.; Choline, 26,037 mg.; Vitamin $B_{12}$, 1 mg.; Antioxidant, 2.5%.

EXAMPLE 6

A medicated granule suitable for domestic pets is prepared as follows: 10 kg. of 1,1-(1,5-dimethylpentamethylene)-3-($\alpha,\alpha,\alpha$-trifluoro-m-tolyl)-2-thiourea, 75 kg. talc, 10 kg. bentonite, 2.5 kg. sodium carboxymethylcellulose, and 2.5 kg. of starch are intimately blended in an appropriate mixer, followed by the addition thereto of about 20 liters of water with thorough mixing.

The mixture thus prepared is extruded into long cylindrical strands, having a diameter from about 0.5 to about 2.0 mm., by forcing the mixture by mechanical pressure through a plate or die in which one or more holes having a diameter of from about 0.5 to about 2.0 mm. are provided. Machinery for this purpose is conventional used in the plastics extrusion trade, is readily available, and known to those skilled in the art. The moist strands, or extrudate, are introduced into a machine of the type designed by Nakahara and described in U.S. Pat. No. 3,277,520, Method and Apparatus for Making Spherical Granules, and identified as a Marumerizer (a trademark of Fuji Denki Kogyo, Osaka, Japan), and converted into spherical granules of a diameter from about 0.5 to about 2.0 mm. The spherical granules so formed are dried by conventional means to remove excess water. Desirably, about 10 to 20 percent by weight of the spherical granules are included in either dry or wet dog or cat food at the time of each feeding of the animal. The pet consuming such medicated food in normal amounts receives a dose of about 75 to about 125 mg./kg. of body weight.

EXAMPLE 7

The preparation of 1000 filled capsules containing 250 mg. of 1,1-(1,5-dimethylpentamethylene) - 3 - ($\alpha,\alpha,\alpha$-trifluoro-m-tolyl)-2-thiourea per capsule is carried out by blending 250 gm. of the active compound, 300 gm. of starch powder, and 10 ml. of mineral oil and filling such mixture into No. 0 capsules in the amount of 560 mg. per capsule.

EXAMPLE 8

Compressed tablets containing 90 mg. of 1,1-(1,5-dimethylpentamethylene) - 3 - ($\alpha,\alpha,\alpha$-trifluoro-m-tolyl)-2-thiourea per tablet suitable for oral administration are made by the following procedure: 90 gm. of 1,1-(1,5-dimethylpentamethylene) - 3 - ($\alpha,\alpha,\alpha$-trifluoro-m-tolyl)-2-thiourea are mixed with 484 gm. of lactose, 6.4 gm. of starch, and 0.3 gm. of magnesium stearate, and the mixture is dry graulated by pressing into large tablets weighing about 25 to about 40 gm. or more. The large tablets are reduced to granules of a size from about 8 to about 20 mesh by processing through an oscillating granulator, known to those skilled in the art. The resultant dry granules are pressed into tablets of size such that each tablet contains 90 mg. of the active agent. The tablets are preferably provided with either a sugar or pliable film coating before being bottled.

EXAMPLE 9

A suspension of 1,1-(1,5-dimethylpentamethylene)-3-($\alpha,\alpha,\alpha$-trifluoro-m-tolyl)-2-thiourea containing 100 mg. of the active compound per 5 ml. of suspension is prepared by the following procedure. About 500 ml. of purified water are placed in a suitable container and 5 gm. of sodium carboxymethylcellulose are hydrated therein, following which 1.0 gm. of soluble saccharin, 10.0 gm. of sodium cyclamate, 10.0 gm. of sodium citrate, 0.75 gm. of methyl-p-hydroxybenzoate, and 250 gm. of granulated cane sugar are dissolved therein. To this mixture are added 0.1 ml. of oil of anise and 250 mg. of vanillin, with stirring. Twenty grams of very finely ground 1,1-(1,5-dimethylpentamethylene) - 3 - ($\alpha,\alpha,\alpha$-trifluoro-m-tolyl)-2-thiourea are slowly introduced into the foregoing solution with vigorous agitation. After completely wetting all of the powder, 150 gm. of granulated cane sugar and an additional quantity of purified water are added to make a total volume of 1000 ml.

What is claimed is:

1. The method of treating helminth infections which comprises the oral administration to a parasitized warm-blooded animal of from about 5 to about 2500 mg./kg. of host body weight of an anthelmintic compound of the formula

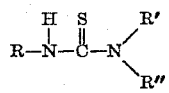

wherein

R is naphthyl, phenyl, or phenyl substituted with at least one substituent selected from the group consisting of $C_1$–$C_4$ alkyl, $C_2$–$C_4$ alkenyl, $C_2$–$C_4$ alkynyl, $C_1$–$C_4$ alkoxy, $C_1$–$C_2$ alkylenedioxy, phenyl, phenoxy, hydroxy, amino, $C_1$–$C_4$ monoalkylamino, $C_1$–$C_4$ dialkylamino, $C_1$–$C_4$ alkanoyl, carboxy, $C_1$–$C_4$ alkoxycarbonyl, carbamyl, $C_1$–$C_4$ alkoxycarbonylamino, $C_1$–$C_4$ alkanoyloxy, $C_1$–$C_4$ alkylsulfonyl, sulfo, sulfamoyl, N-$C_1$–$C_4$ alkylsulfamoyl, N,N-$C_1$–$C_4$ dialkylsulfamoyl, halo, halomethyl, dihalomethyl, trihalomethyl, nitro, and cyano;

R' and R'', when taken separately, each independently represents a member selected from the group consisting of $C_3$–$C_6$ alkyl branched at the carbon attached to the nitrogen, cyclopentyl, cyclohexyl, and cycloheptyl.

2. The method of claim 1 wherein the compound administered is 1,1-diisopropyl-3-($\alpha,\alpha,\alpha$-trifluoro-m-tolyl)-2-thiourea.

3. The method of claim 1 wherein the compound administered is 1,1-dicyclohexyl-3-($\alpha,\alpha,\alpha$-trifluoro-m-tolyl)-2-thiourea.

4. The method of claim 1 wherein the compound administered is 1,1 - di(sec - butyl)-3-(3-chloro-p-tolyl)-2-thiourea.

5. The method of claim 1 wherein the compound administered is 1,1-diisopropyl-3-(3,4-xylyl)-2-thiourea.

6. The method of claim 1 wherein the compound administered is 3-(3,4-dichlorophenyl)-1,1-diisopropyl - 2-thiourea.

References Cited
UNITED STATES PATENTS

| | | | |
|---|---|---|---|
| 3,266,982 | 8/1966 | Popoff | 424—322 |
| 3,365,360 | 1/1968 | Taylor | 424—322 |
| 3,376,194 | 4/1968 | Berger et al. | 424—322 |

SAM ROSEN, Primary Examiner

U.S. Cl. X.R.

424—304